Patented July 10, 1951

2,559,676

UNITED STATES PATENT OFFICE 2,559,676

ANTHRAQUINONE VAT DYESTUFFS

Herman E. Schroeder and Lorraine A. Ringrose, Wilmington, Del., assignors to E. I. du Pont de Nemours & Company, Wilmington, Del., a corporation of Delaware No Drawing. Application October 11, 1949, Serial No. 120,814

4 Claims. (Cl. 260—275)

This invention relates to the preparation of new anthraquinone vat dyes, and more particularly those dyes which may be represented by the formula:

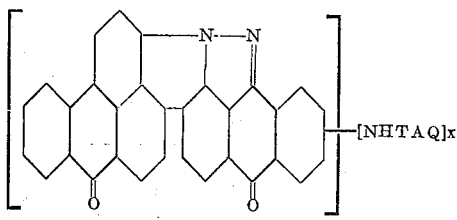

in which TAQ is the thiophanthraquinone nucleus attached to the imino group through one of the positions 5 and 8, and X is one of the numbers 1 and 2, and their halogen substitution products.

In U. S. Patent 1,943,710 dyestuffs of somewhat similar constitution, but which carry an anthraquinone radical in place of the thiophanthraquinone in the above formula, are disclosed, and it is known that these dyes possess good fastness properties. However, they have not been found of real commercial significance because of their poor dyeing behavior which is more or less characteristic of the dyes of the benzanthrone-pyrazolanthrone series. In general, they dye too rapidly, giving uneven or "reedy" dyeings, and exhibit poor stability in the vatted condition and are in general unsuitable for use in the printing processes ordinarily employed in the printing of vat dyes.

It is an object of this invention to provide a series of dyes which possess excellent overall fastness properties but which have greatly improved dyeing characteristics as compared to the dyes of U. S. Patent 1,943,710. A further object of the invention is to provide anthraquinone vat dyes which dye cellulose fibers in gray shades having greater brightness and clarity of hue than are obtainable with the dyes carrying the anthraquinone radical in place of the thiophanthraquinone radical. A further object of the invention is to provide dyes of the benzanthrone-pyrazolanthrone series which have improved printing properties and which build-up in heavy shades when applied in the usual vat color printing formulations. A still further object of the invention is to provide gray vat dyes of the benzanthrone-pyrazolanthrone series which dye in bluer shades of gray than those previously obtained in this class and which have improved application properties in both the dyeing and printing processes.

The dyes of the present invention may be prepared by condensing mono- or dihalogenbenzanthrone with one mol of an alkali salt of pyrazolanthrone (substituted by halogen, if desired) and then further condensing that product with one or two mols of 5-aminothiophanthraquinone or the 8-aminothiophanthraquinone and then subjectnig the resulting thiophanthraquinonyl-amino-benzanthronylpyrazolanthrone compound to caustic alkali fusion.

These dyes, produced by the caustic alkali fusion, dissolve in concentrated sulfuric acid to give green solutions, and dye cellulose fibers greenish-gray to bluish-gray shades of excellent fastness properties from green alkaline hydrosulfite vats. These dyes have excellent light-fastness and wet-fastness properties, particularly to bleach. They exhibit superior dyeing and printing properties and produce dyeings which are markedly brighter and clearer in hue and are easier to vat than the analogous anthraquinone amino-substituted benzanthrone-pyrazolanthrone compounds.

The condensations of the halogen benzanthrone with the pyrazolanthrone and the further condensation of the aminothiophanthraquinone may be carried out under any of the usual condensation conditions employed in the prior art for the preparation of the analogous colors using anthraquinone in place of the thiophanthraquinone. The caustic alkali fusion of the resulting condensation products is likewise carried out by any of the processes normally employed in the ring closure of the benzanthronyl-aminoanthraquinone compounds, that is, by the use of alkaline condensing agents in an alcoholic medium such as, for example, potassium hydroxide in ethyl alcohol or in ethanolamine.

The following examples are given to illustrate the invention. The parts used are by weight.

*Example 1*

A mixture of 135 parts of dry nitrobenzene, 6 parts pyrazolanthrone and 2.2 parts of dried potassium carbonate are heated for two hours at 185°–190° C., after which 10.3 parts of 6,Bz-1-dibromobenzanthrone are added and the charge is refluxed for four hours. There are then added 6.5 parts of 5-aminothiophanthraquinone, 6.3 parts of fused sodium acetate and 2.2 parts of copper carbonate, and the charge is refluxed for 20 hours. The charge is filtered at 60° C., the cake washed in turn with nitrobenzene, alcohol and water. The brown crystalline product of needle-like form is slurried in hot dilute hydrochloric acid, filtered, washed acid-free and dried.

Ring closure to the dyestuff is then carried out by adding 12.5 parts of the above condensation product to a melt of 62.5 parts of potassium hydroxide in 50 parts of 90% ethanol at 95°–100° C. The melt is heated at 95°–100° C. for six hours after which it is drowned in about 1200 cc. of water and the suspension is then stirred for several hours at room temperature. The resulting dye is filtered off and washed with water and purified by vatting, filtering and oxidizing to precipitate the color. The fusion product of N-[6-(5-thiophanthraquinonylamino) - Bz - 1-benzanthronyl]pyrazolanthrone, which dyes cotton in clear blue-gray shades of excellent light and bleach fastness from a green alkaline-hydrosulfite vat, is believed to be properly represented by the formula:

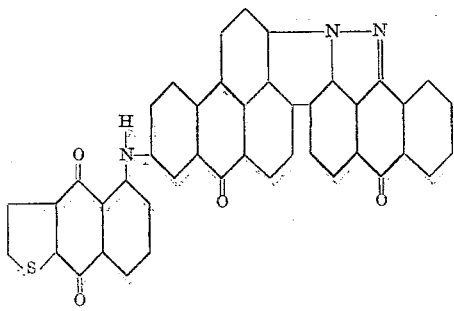

*Example 2*

A mixture of 95 parts of nitrobenzene, 4.1 parts of pyrazolanthrone and 1.5 parts of dry potassium carbonate is heated at 185°–190° C. for two hours, after which 7 parts of 6,Bz-1-dibromobenzanthrone are added and the mixture is heated at reflux for four hours. Then at 150° C. there are added 4.5 parts of 8-aminothiophanthraquinone, 4.3 parts of fused sodium acetate and 1.5 parts of copper carbonate; the charge is heated at reflux for 20 hours and the condensation product is isolated as described in Example 1.

The dyestuff is prepared by adding 10.5 parts of the above condensation product to a melt of 52.5 parts of potassium hydroxide in 42 parts of ethanolamine at 95° C. The fusion product of N-[6 - (8 - thiophanthraquinonylamino) - Bz-1-benzanthronyl]-pyrazolanthrone is isolated as described in Example 1. It dyes cellulosic fibers in clear blue-gray shades of excellent light and bleach fastness from a green alkaline hydrosulfite vat. It is believed to be properly represented by the formula:

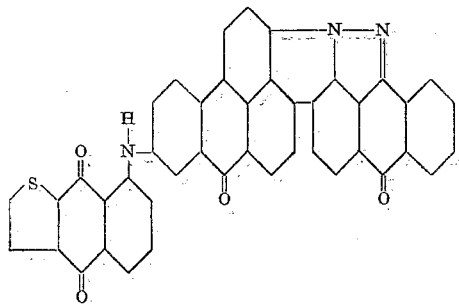

*Example 3*

A mixture of 120 parts of nitrobenzene, 5.5 parts of 8-chloropyrazolanthrone, 1.9 parts of potassium carbonate and 8.3 parts of 6,Bz-1-dibromobenzanthrone is refluxed for four hours, then at 130° C. there are added 5.1 parts of 5-aminothiophanthraquinone, 5.1 parts of fused sodium acetate and 1.0 part of copper carbonate and the charge is heated at reflux for 20 hours. The orange-brown crystalline condensation product is filtered at 90° C., washed with nitrobenzene, slurried in nitrobenzene at 145° C., filtered hot, washed in turn with nitrobenzene, alcohol and water. The cake is slurried in dilute hydrochloric acid at 90° C., filtered, washed acid-free with water and dried.

Eight (8) parts of the above condensation product are added to a melt of 40 parts of potassium hydroxide in 32 parts of ethanolamine at 95°–100° C. The fusion product of 8-chloro-N-[6-(5-thiophanthraquinonylamino) - Bz - 1 - benzanthronyl]pyrazolanthrone is isolated and purified as in Example 1. The product is believed to be properly represented by the formula:

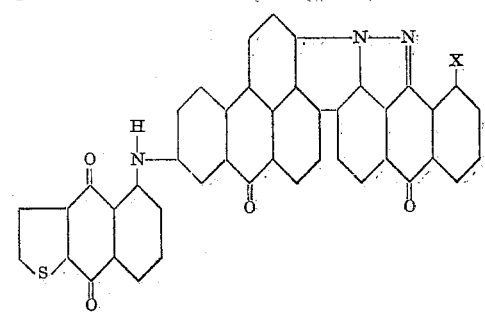

X=Cl fused

It dyes vegetable fibers in blue-gray shades from a green alkaline hydrosulfite vat.

Similarly, the 5-chloropyrazolanthrone may be used in place of the 8-isomer to give a product which dyes in gray shades of good fastness.

*Example 4*

Eight (8) parts of the condensation product from 6 parts of 6,Bz-1-dibromobenzanthrone, 4 parts of 8-chloropyrazolanthrone, 7.4 parts of 5-aminothiophanthraquinone in 95 parts of nitrobenzene (made according to the procedure given in Example 3) is added to a melt of 40 parts of potassium hydroxide in 32 parts of ethanolamine at 95°–100° C. and the charge treated as described in Example 1. This fusion product of 8-[5-thiophanthraquinonylamino]-N - [6-(5-thiophanthraquinonylamino)-Bz - 1 - benzanthronyl]pyrazolanthrone, which dyes vegetable fibers in gray shades of very good wet fastness and light fastness from a green alkaline hydrosulfite vat, is believed to be properly represented by the formula:

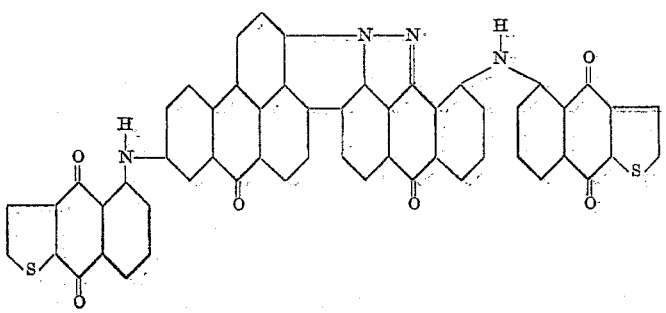

Example 5

Nine (9) parts of the yellow-brown crystalline condensation product prepared by reacting 6.7 parts of 8-chloropyrazolanthrone, 8 parts of Bz-1-bromobenzanthrone and 6.3 parts of 5-aminothiophanthraquinone (by the procedure given in Example 3) are added to a melt of 45 parts of potassium hydroxide and 36 parts of ethyl alcohol (90%) at 95°–100° C. The charge is treated as in Example 1. This fusion product of 8-[5-thiophanthraquinonylamino] - N - [Bz - 1 - benzanthronyl]pyrazolanthrone, which dyes vegetable fibers in gray shades from a green alkaline hydrosulfite vat, is considered as having the formula:

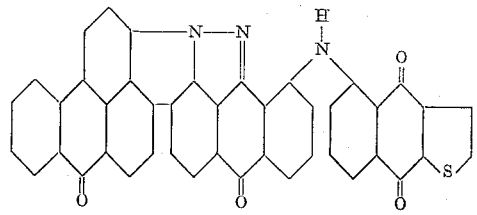

Example 6

To 100 parts of 93% sulfuric acid at 18°–20° C., are added 10 parts of the fusion product prepared as in Example 1. When solution is complete (about one hour), a mixture of 2.4 parts of bromine and 2 parts of sulfuryl chloride is added slowly. The charge is stirred three hours, then drowned in cold water and the product is filtered and washed acid-free. The brominated product, which gives a green solution in concentrated sulfuric acid and dyes vegetable fibers in blue-gray shades (greener than the product of Example 1) from a green alkaline hydrosulfite vat, is believed to be properly represented by the formula:

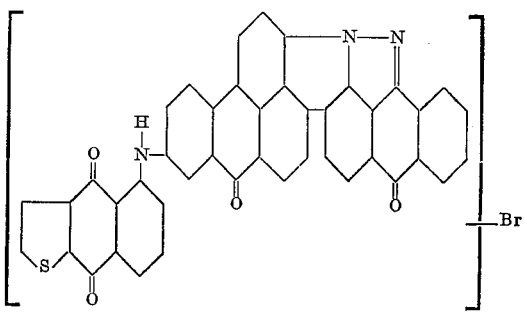

In a similar manner, the product may be chlorinated in place of brominated, by carrying out the reaction with sulfuryl chloride in sulfuric acid.

In Examples 3, 4, 5 or 6 the 8-aminothiophanthraquinone may be employed in place of the 5-isomer or mixtures of the two isomers may be used to give dyes of similarly good application properties.

The caustic alkali fusions may be carried out under a variety of conditions as to temperature and time. Temperatures of from 85° to 110° C. will in general be found to give satisfactory results, although temperatures outside this range may be employed where desired. The time in which the reaction is carried out depends upon the temperature employed as well as upon the reagents used. The fusion products may be further halogenated, if desired, by any of the usual methods employed in the halogenation of the fusion products of benzanthronylaminoanthraquinone.

The dyes of this invention have unexpectedly good dyeing properties for compounds which contain in the molecules the benzanthrone-pyrazolanthrone nucleus. They are comparatively easy to vat and have surprisingly good vat stability. The product of Example 1, for instance, shows very good vat stability at 120° F. or at 140° F. as compared to the corresponding dyestuff produced from 1-aminoanthraquinone which has relatively poor stability in the vat.

We claim:

1. The compounds of the class consisting of those of the following general formula:

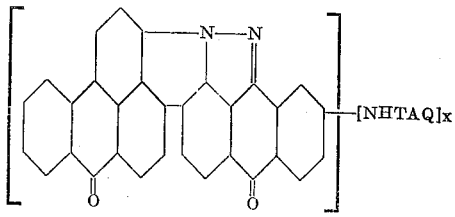

in which TAQ is the thiophanthraquinone nucleus attached to the imino group through one of the positions 5 and 8 and X is one of the numbers 1 and 2, and their mono-chloro and mono-bromo products.

2. The compound having the formula:

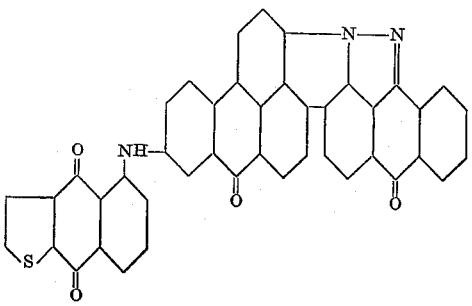

3. The mono-chlorination product of the compound of claim 2.

4. The mono-bromination product of the compound of claim 2.

HERMAN E. SCHROEDER.
LORRAINE A. RINGROSE.

REFERENCES CITED

The following references are of record in the file of this patent:

UNITED STATES PATENTS

| Number | Name | Date |
| --- | --- | --- |
| 1,857,553 | Kunz | May 10, 1932 |
| 1,938,059 | Wilke et al. | Dec. 5, 1933 |